(12) United States Patent
Shaw et al.

(10) Patent No.: US 10,116,714 B2
(45) Date of Patent: Oct. 30, 2018

(54) APPARATUS AND METHOD FOR ON-DEMAND MULTI-DEVICE SOCIAL NETWORK EXPERIENCE SHARING

(71) Applicant: AT&T Intellectual Property I, L.P., Atlanta, GA (US)

(72) Inventors: Venson Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 161 days.

(21) Appl. No.: 14/740,047

(22) Filed: Jun. 15, 2015

(65) Prior Publication Data
US 2016/0366199 A1   Dec. 15, 2016

(51) Int. Cl.
G06F 15/16 (2006.01)
H04L 29/06 (2006.01)
H04L 29/08 (2006.01)

(52) U.S. Cl.
CPC ...... H04L 65/4084 (2013.01); H04L 65/1066 (2013.01); H04L 67/306 (2013.01)

(58) Field of Classification Search
CPC ..... G06Q 50/01; H04L 65/4084; H04L 67/14; H04N 21/2743
See application file for complete search history.

(56) References Cited

U.S. PATENT DOCUMENTS 7,702,728 B2   4/2010   Zaner et al.
8,209,618 B2   6/2012   Garofalo
(Continued)

FOREIGN PATENT DOCUMENTS

EP   2584761 A1   4/2013
EP   2587767 A2   5/2013

OTHER PUBLICATIONS da Conceição, Arlindo F., et al. "Empowering Mobile Users: Create Your Own Mobile Application for Data Collection in the Cloud." Mobile Computing, Applications and Services, Springer. International Publishing, 2014. 269-272. http://link.springer.com/chapter/10.1007/978-3-319-05452-0_21 Discloses a cloud infrastructure that allows users to create mobile applications to collect and visualize data, collected data can be shared among users on a social network, allowing Apps to extract intelligence from the collected data.

(Continued)

*Primary Examiner* — Tauqir Hussain
*Assistant Examiner* — Kamran Mohammadi

(57) ABSTRACT

Methods, computer-readable media and apparatuses for sharing an experience via a social network on demand are disclosed. A processor establishes a first video session with a mobile endpoint device of a user, the first video session is established after the mobile endpoint device is authenticated as being allowed to capture a video of a live event at a commercial venue, the first video session containing the video of the live event at the commercial venue that the user is attending, receives at least one social media connection of the user for receiving the video, sends a notification to each social media connection of the at least one social media connection that the video is available, receives a request from the at least one social media connection to access the video, and establishes a second video session with an endpoint device of the at least social media connection.

20 Claims, 4 Drawing Sheets

(56) References Cited

U.S. PATENT DOCUMENTS

| | | | |
|---|---|---|---|
| 8,214,862 | B1 | 7/2012 | Lee et al. |
| 8,396,220 | B2 | 3/2013 | Hu et al. |
| 8,442,424 | B2 | 5/2013 | Socolof |
| 8,522,289 | B2 | 8/2013 | Athsani et al. |
| 8,601,506 | B2 | 12/2013 | Harwell et al. |
| 8,621,019 | B2 | 12/2013 | Nguyen et al. |
| 8,756,692 | B2 | 6/2014 | Williams |
| 8,817,065 | B1 | 8/2014 | Mo |
| 8,856,256 | B1 | 10/2014 | Srinivasan |
| 8,862,764 | B1 | 10/2014 | Garcia-barrio |
| 8,898,804 | B2 | 11/2014 | Roy et al. |
| 8,922,967 | B2 | 12/2014 | Goelz et al. |
| 8,929,922 | B2 | 1/2015 | Ginn et al. |
| 9,219,776 | B2 | 12/2015 | LeCroy |
| 9,413,809 | B1* | 8/2016 | Morse .............. H04L 67/02 |
| 2007/0188712 | A1* | 8/2007 | Kutner .............. E04H 3/22 353/15 |
| 2008/0020814 | A1* | 1/2008 | Kernene .............. H04N 21/235 463/10 |
| 2009/0013263 | A1* | 1/2009 | Fortnow .............. G06Q 10/10 715/753 |
| 2010/0094686 | A1 | 4/2010 | Henshaw et al. |
| 2010/0138480 | A1 | 6/2010 | Benedetto |
| 2010/0208082 | A1 | 8/2010 | Buchner et al. |
| 2010/0250704 | A1 | 9/2010 | Kittel |
| 2011/0029512 | A1 | 2/2011 | Folgner et al. |
| 2011/0090347 | A1 | 4/2011 | Buckner et al. |
| 2011/0307399 | A1 | 12/2011 | Holmes |
| 2012/0036494 | A1 | 2/2012 | Gurumohan et al. |
| 2012/0110096 | A1 | 5/2012 | Smarr et al. |
| 2012/0192242 | A1 | 7/2012 | Kellerer et al. |
| 2012/0224024 | A1* | 9/2012 | Lueth .............. H04L 65/605 348/43 |
| 2012/0239560 | A1 | 9/2012 | Pourfallah et al. |
| 2012/0289239 | A1 | 11/2012 | Luna et al. |
| 2013/0024901 | A1 | 1/2013 | Sharif-ahmadi et al. |
| 2013/0031155 | A1 | 1/2013 | Terrano et al. |
| 2013/0031187 | A1 | 1/2013 | Rajesh et al. |
| 2013/0036171 | A1 | 2/2013 | Gilbert |
| 2013/0103814 | A1 | 4/2013 | Carrasco et al. |
| 2013/0110929 | A1 | 5/2013 | Gundotra et al. |
| 2013/0130659 | A1 | 5/2013 | Sadhvani |
| 2013/0170819 | A1* | 7/2013 | Dykeman ........ H04N 21/41407 386/299 |
| 2013/0173796 | A1 | 7/2013 | Grab et al. |
| 2013/0294749 | A1* | 11/2013 | Burns .............. H04N 9/87 386/278 |
| 2013/0346498 | A1 | 12/2013 | Asver et al. |
| 2014/0067834 | A1 | 3/2014 | Hutten |
| 2014/0181110 | A1 | 6/2014 | Imbruce et al. |
| 2014/0258405 | A1 | 9/2014 | Perkin |
| 2014/0365566 | A1 | 12/2014 | Lessin |
| 2016/0142382 | A1 | 5/2016 | Ziebell |

OTHER PUBLICATIONS

Zhang, Xinwen, et al. "Towards an elastic application model for augmenting the computing capabilities of mobile devices with cloud computing." Mobile Networks and Applications 16.3 (2011): 270-284. http://citeseerx.ist.psu.edu/viewdoc/download?doi=10.1.1.463.1694&rep=rep1&type=pdf Discloses elastic application model that enables seamless and transparent use of cloud resources to augment the capability of resource-constrained mobile devices.

Liu, Zimu, Yuan Feng, and Baochun Li. "Socialize spontaneously with mobile applications." INFOCOM, 2012 Proceedings, IEEE, 2012. http://citeseerx.ist.psu.edu/viewdoc/download?doi=10.1.1.305.1401&rep=rep1&type=pdf Discloses design and implement a new system framework, Reflex, to provide the required system support to achieve spontaneous social interaction with other users in the same mobile application.

"A Standards-based, Open and Privacy-aware Social." Web W3C Incubator Group Report, Dec. 6, 2010. http://www.w3.org/2005/Incubator/socialweb/XGR-socialweb-20101206/ Discloses allow people to create networks of relationships across the entire Web, while giving people the ability to control their own privacy and data.

Stephanie Clifford, "A Front-Row Seat via Video", www.nytimes.com, Feb. 21, 2013_ http://www.nytimes.com/2013/02/22/business/via-video-a-front-row-seat-to-a-fashion-show.html?_r=0 Discloses "Belstaff, a British brand known for its outerwear, gathered data via the live stream of its recent women's show in a few ways. It syndicated the live streams on a Number of fashion sites . . . a live lookbook feature that let people share runway looks via social media."

Susan Miller, "Table Talk News South Africa: Business-Savy Shirly to Launch Game-Changing Social Network", www.facebook.com, Dec. 18, 2014 https://www.facebook.com/permalink.php?story_fbid=1026422264051362&id=601263663233893&substory_index=0 Discloses "a better"more efficient, greener, cost effective way" by allowing its users to share multimedia content by sending live videos".

"NEC Basketball "Social Media Day" to Be Held Today At Barclays Center; Watch Live on ESPN3", www.sfcathletics.com, Oct. 21, 2014 http://www.sfcathletics.com/news/2014/10/21/MBB_1021140439.aspx Discloses "an interactive experience for fans to join the conversation on social media while watching the proceedings live and in HD on both NEC Front Row and ESPN3 beginning at 11 a.m."

"Fan Photos and videos, All in One Place", wesawit.com wesawit.com Discloses "instantly display fan-generated photos and videos, live from any show, anywhere in the world."

"New Social Mobile App—Wesawit—Puts Fans in the Front Row to the Hottest Events Around", www.businesswire.com, Apr. 24, 2013 http://www.businesswire.com/news/home/20130424006462/en/Social-Mobile-App-%E2%80%93-Wesawit-%E2%80%93-Puts#.VTed8mTBzRY Discloses "the Wesawit app offers live-streams of photos and videos taken by event-goers themselves. People can share experiences with friends and participate virtually in any event, such as a Lady Gaga concert or a Lakers Game, regardless of geographic location."

\* cited by examiner

APPARATUS AND METHOD FOR ON-DEMAND MULTI-DEVICE SOCIAL NETWORK EXPERIENCE SHARING

The present disclosure relates generally to social networking and, more particularly, to an apparatus, method and a computer-readable medium for sharing an experience via a social network on demand.

BACKGROUND

Today, professional sports and entertainment events are selling physical tickets. As a result, individuals are required to purchase a physical ticket to attend a live event. However, the physical tickets can be very expensive and a group of friends may not be able to attend the event together because not everyone can afford to pay for the physical tickets. As a result, some individuals may not be able to attend the event and share the experience with their friends.

SUMMARY

In one example, the present disclosure discloses a method, computer-readable medium, and apparatus for sharing an experience via a social network on demand. For example, the method may include a processor of a service provider of a communication network that provides a communication service, where the processor establishes a first video session with a mobile endpoint device of a user, wherein the first video session is established after the mobile endpoint device is authenticated as being allowed to capture a video of a live event at a commercial venue, the first video session containing the video of the live event at the commercial venue that the user is attending, receives at least one social media connection of the user for receiving the video, sends a notification to each social media connection of the at least one social media connection that the video is available, receives a request from the at least one social media connection to access the video, and establishes a second video session with an endpoint device of the at least social media connection to provide the video.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for sharing an experience via a social network on demand. As discussed above, professional sports and entertainment events are selling physical tickets. As a result, individuals are required to purchase a physical ticket to attend a live event. However, the physical tickets can be very expensive and a group of friends may not be able to attend the event together because not everyone can afford to pay for the physical tickets or possibly there are not enough physical tickets available for the live event. As a result, some individuals may not be able to attend the event and share the experience with their friends.

One embodiment of the present disclosure allows users to share an experience via a social network on demand. As a result, friends of a user who could not afford to purchase a ticket to a live event, or were unable to purchase a ticket due to limited supply, may still be able to share the experience with the user.

In one embodiment, the present disclosure may be used to allow an event promoter, or a service provider to sell virtual tickets for a live event to be held at a "commercial" venue. A commercial venue (e.g., a theater, a concert hall, an arena or a stadium) is intended to cover a physical venue that a user travels to in order to observe a live event. Thus, a commercial venue does not cover a user's own home or any other venues that the user does not need a ticket for entry to observe the live event. As a result, additional revenue may be generated by selling an unlimited number of "virtual" tickets to a live event that is typically limited by the physical size and space constraints (e.g., limited number of seats in a theater, a concert hall, an arena or stadium). In addition, the users at the live event may provide a number of different unique views, or a personal perspective, of the live event.

Figure 1:
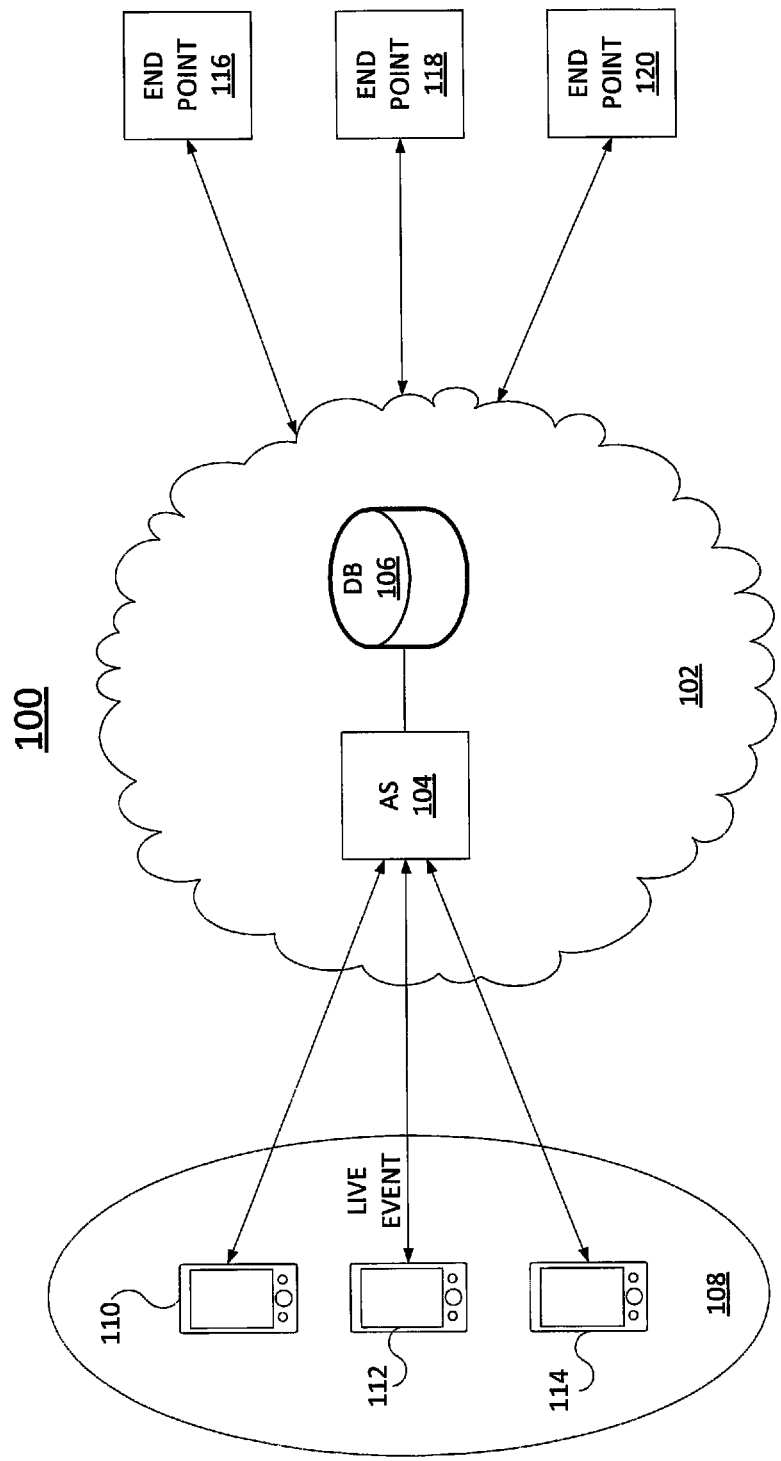
FIG. 1 illustrates an example network related to the present disclosure.

To aid in understanding the present disclosure, FIG. 1 illustrates a communication network 100. In one embodiment, the communication network 100 may include an Internet Protocol (IP) network 102. In one embodiment, the IP network 102 may be a managed network (e.g., a multi-protocol label switching (MPLS) core network). The IP network 102 may include an application server (AS) 104 and a database (DB) 106. Although only a single AS 104 and a single DB 106 is illustrated in FIG. 1, it should be noted that any number of application servers and databases may be deployed.

Figure 4:
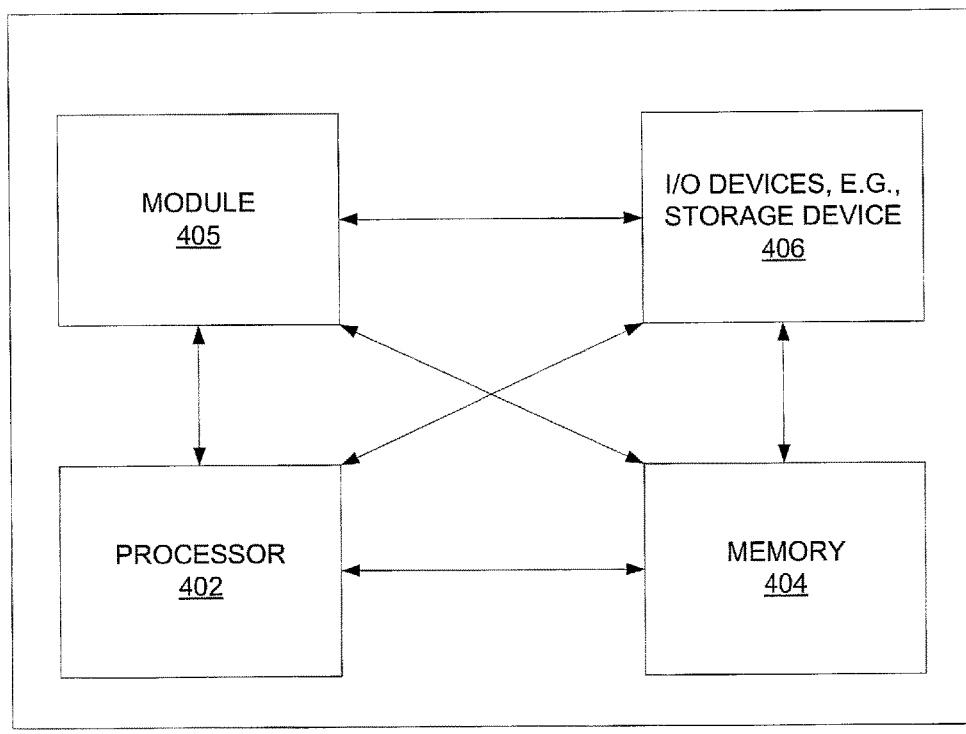
FIG. 4 illustrates a high-level block diagram of a computer suitable for use in performing the functions described herein.

In one embodiment, the AS 104 may be deployed as a computer having a processor and a memory as illustrated in FIG. 4 and discussed below. In one embodiment, the AS 104 may be configured (e.g., loaded with computer readable instructions or software applications) to perform the functions described herein. In one embodiment, the AS 104 may be located at the live event 108 or the IP network 102, as illustrated in FIG. 1.

In one embodiment, the DB 106 may store multi-media or video data from one or more mobile endpoints 110, 112 and 114. The DB 106 may also store subscription data related to which users are subscribed to the on-demand social media experience sharing service. In other words, the one or more endpoint devices 110, 112 and 114 are subscribed devices of the service provider of the communication network 102, e.g., an IP communication network. In one embodiment, the DB 106 may store a list of social media connections of each user associated with the one or more mobile endpoints 110, 112 and 114. In one embodiment, the service provider is an operator of a communication network that provides various communication services in addition to the on-demand social media experience sharing service as discussed below. In other words, the service provider may operate one or more communication networks (e.g., access networks and/or core networks) that may provide one or more of the following example communication services: cellular services, data services, messaging services such as text messaging services, local and/or long distance telephone services, Internet access services, home security monitoring services, media content delivery services (e.g., delivery of television programming, movies and the like), and so on.

In one embodiment, the DB 106 may also store contractual or licensing agreements between a venue of a live event 108 and the service provider of the IP network 102. For example, the service provider may agree to provide a share of revenue to the venue of the live event 108 in exchange for allowing video to be captured and shared by users at the live event 108.

It should be noted that the IP network 102 has been simplified for ease of explanation. The IP network 102 may include additional network elements that are not shown, such as for example, a gateway (e.g., a serving gateway, a packet data network gateway, and the like), a firewall, a call control element, one or more access networks, an authentication, authorization and accounting server, a home subscriber server, a mobility management entity, and the like. In one embodiment, the IP network 102 may be a cellular communication network (e.g., a 3G, 4G, LTE, and the like).

In one embodiment, the one or more mobile endpoint devices 110, 112 and 114 may be any type of mobile endpoint device capable of capturing multimedia or video of the live event 108. For example, the mobile endpoint devices 110, 112 and 114 may be a smart phone with video recording capability, a tablet computer with video recording capability, a laptop computer with video recording capability, a video recorder with wireless communication capability, and the like.

In one embodiment, a different user may be associated with each one of the one or more endpoint devices 110, 112 and 114 and who may be attending the live event 108. In one embodiment, the live event 108 may be a sporting event, a musical concert, a play, a theatrical performance, a recital and the like. In other words, the live event 108 may be any live event where a physical ticket is typically required to enter the venue and watch the live event. However, as discussed above, the tickets for live events are usually very expensive and limited in supply due to the physical size and space constraints.

The different user associated with each one of the one or more endpoint devices 110, 112 and 114 may be located in a different section or seat of the live event. As a result, the different users will be able to capture on video a different view or perspective of the same live event. In addition, the different users may be around different people and have a different experience that they can share. For example, the ambient noise captured by one endpoint device, e.g., the surrounding crowd noise around one user, will be completely different from the ambient noise around a different user. In yet another example, the ambient noise may capture the voice of the user or conversations conducted by the user of the device with other surrounding attendees as the user is watching the live event at the commercial venue. Thus, the captured video provides a very realistic representation of the localized user experience corresponding to a particular seat at the commercial venue.

In another example, the user associated with the endpoint device 110 may be a celebrity with courtside tickets to a basketball game that is surrounded by other celebrities. As a result, the video captured by the user associated with the endpoint device 110 may include conversations of celebrities attending the live event and close images of these celebrities near the user associated with endpoint device 110. The user associated with the endpoint device 112 may have a seat near the basket and have a good view of slam dunks or other action around the rim of a basketball event. The user associated with the endpoint device 114 may have a seat in the upper deck and have an ordinary view of the live event 108.

In one embodiment, the different users may each have a different list of social media connections stored in the DB 106 with the service provider of the IP network 102. In one embodiment, the social media connections may include friends, family members, acquaintances, co-workers, and the like. Each different user may add or remove social media connections as desired and set security parameters for each social media connection on his or her respective list. For example, friends and family members may be able to access video sent by the user from the live event without restrictions. On the other hand, acquaintances may not have access to the videos, or require a password distributed by the user, and the like. The security parameters may be used by the service provider to determine which social media connections on a user's list may be notified when a video is available, as discussed in further detail below.

In one embodiment, a user associated with the mobile endpoint device 110 may begin capturing video that is sent to the AS 104. The user may indicate that he or she would like to share the live event experience (e.g., the video that is being captured) with her friends in her list of social media connections that is stored in the DB 106. In other words, the live event experience can be shared "on-demand" because the service provider may notify the user's social media connections immediately after the captured video and request to share are sent to the AS 104.

In addition, sharing is "on-demand" because the user's social media connections do not need to wait until they check a status page to realize the video is available. Rather, the service provider may send a notification to the social media connections immediately.

In response, the AS 104 may notify endpoint devices 116, 118 and 120 associated with each one of the user's friends. In one embodiment, each friend may receive the notification and use his or her respective endpoint device 116, 118 or 120 to access the video sent by the mobile endpoint device 110 of the user. In one embodiment, the notification may be sent via a pop-up message, a text message, a voice call, a video call, an email, and the like.

In one embodiment, the endpoint devices 116, 118 and 120 may be any type of endpoint device. For example, the endpoint devices 116, 118 and 120 may be a desktop computer, a smartphone, a laptop computer, a tablet computing device, a smart television, a wearable device with voice and video capability, and the like. In one embodiment, the one or more endpoint devices 116, 118 and 120 are subscribed devices of the service provider of the IP network 102. In other words, the one or more endpoint devices 110, 112, 114, 116, 118 and 120 are subscribed devices of the service provider of the IP network 102, e.g., identified via information associated with International Mobile Subscriber Identity (IMSI) number and the like.

In one embodiment, the captured video may be accessed by establishing a second separate connection to the AS 104 via the endpoint device 116, 118 or 120. In other words, the live event experience is shared via two separate connections to the AS 104 and not a point-to-point connection between the mobile endpoint device 110 and the endpoint devices 116, 118 and 120.

When the endpoint devices 116, 118 and 120 access the captured video from the live event, the friends may share the experience that the user at the live event is experiencing via the video captured by the user's mobile endpoint device 110. In other words, the friends may see and hear everything that the user is seeing and hearing at the live event 108 from the user's perspective.

In one embodiment, the service provider may establish a license or a contract with the league, venue, performers, event promoter and the like, to allow the video that is captured at the live event 108 to be shared with other users that are not attending the live event 108. For example, the service provider may charge a user and/or each friend of the user a subscription fee to provide video to share with the user's social media connections and to allow the social media connections to access the video. For example, the videos provided to the AS 104 may be considered as unique live content that can be watched on a subscription basis with the consent of the live event promoter.

In one embodiment, the videos submitted by all of the mobile endpoint devices 110, 112 and 114 may be provided to users associated with the endpoint devices 116, 118 and 120. For example, the users of the endpoint devices 116, 118 and 120 may browse which videos are available and see information associated with who is submitting the video or what seat the video is being captured from. In one embodiment, a user of the endpoint device 116 may request to be added as a social media connection of the user associated with the mobile endpoint device 112 if the user of the endpoint device 116 is interested in watching the video submitted by the user associated with the mobile endpoint device 112. For example, the user associated with the mobile endpoint device 112 may be sitting at the 50 yard line, or at one of the end zones of a football game, and so on.

In one embodiment, the AS 104 may have information regarding what type of endpoint devices 116, 118 and 120 are subscribed to the sharing an experience via a social network on-demand service. As a result, the AS 104 may automatically encode the video for compatibility with each of the endpoint devices 116, 118 and 120 to maximize the viewing experience. For example, the endpoint device 116 may require MPEG4 encoding, the endpoint device 118 may require H.264 encoding and the endpoint device 120 may require H.265 encoding. Thus, the AS 104 may provide differently coded video to each one of the different type of endpoint devices 116, 118 and 120 simultaneously when the endpoint devices 116, 118 and 120 attempt to access the video at the same time.

Figure 2:
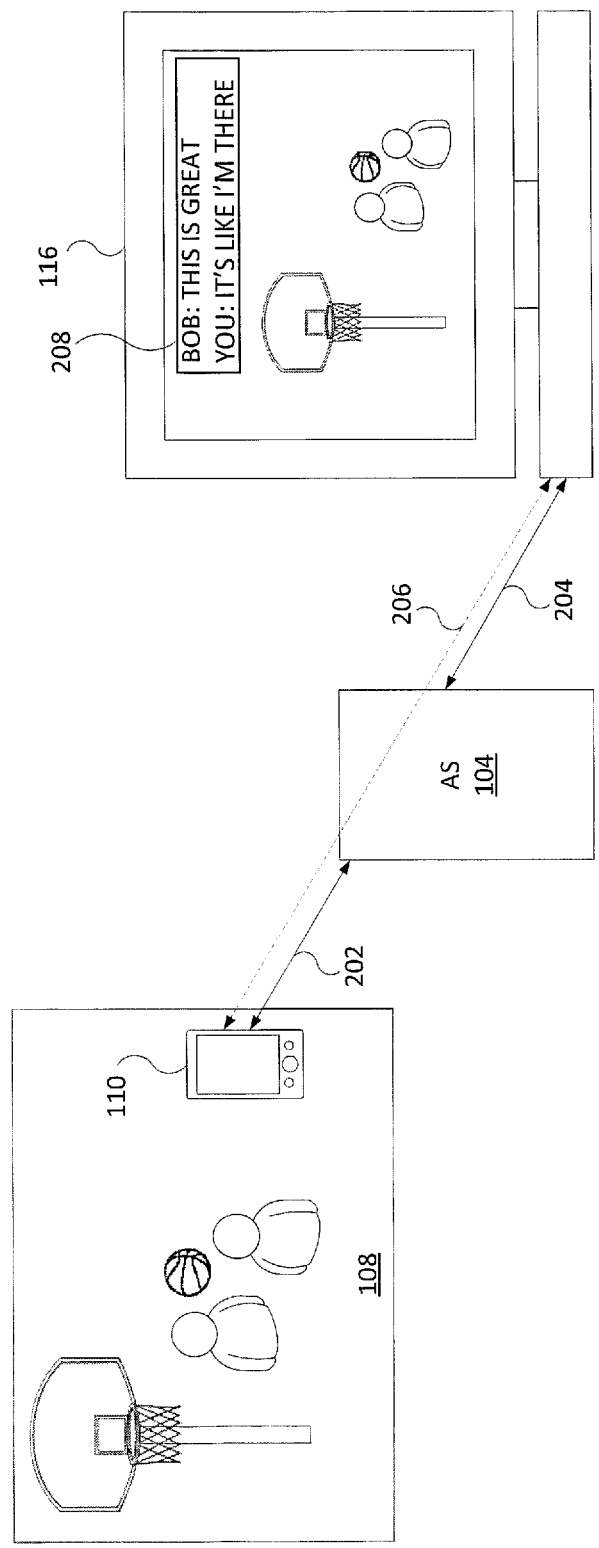
FIG. 2 illustrates an example block diagram of sharing an experience via a social network on demand between two endpoints.

FIG. 2 illustrates an example block diagram of sharing a live event experience via a social network on-demand between two endpoints. For example, as noted above, the experience may be shared via two independent connections to the AS 104. For example, a first connection 202 may be between the mobile endpoint device 110 and the AS 104 and a second connection 204 may be between the AS 104 and the endpoint device 116. As a result, the endpoint device 116 may see the same view captured by the user via his or her mobile endpoint device 110 at the live event 108.

In one embodiment, a second point-to-point connection 206 may be established between the mobile endpoint device 110 and the endpoint device 116 for full duplex communications. For example, the user of the mobile endpoint device 110 and the social media connection or friend of the endpoint device 116 may communicate with one another as they are sharing the experience. In one embodiment, the full duplex communication may be a messaging session as illustrated in the endpoint device 116. In another embodiment, the full duplex communication may be a voice call or a video call. For example, the mobile endpoint device 110 and the endpoint device 116 may have a picture-in-picture window for the video call while the two endpoints are sharing the experience of the live event 108.

In one embodiment, the service provider may provide a software application that is executed on the mobile endpoint device 110 and the endpoint device 116. The application may provide a menu of options to capture video of the live event 108 and automatically send the video to the AS 104 along with a notification to the list of social media connections of the user. The software application may allow the user to receive requests to add another user as a social media connection, remove social media connections, create subgroups of social media connections for sharing live event experiences on-demand, and the like. In addition, the software application may provide the endpoint device 116 a listing of users who are currently sharing an experience at a live event that the user can send a request to be added as a social media connection. For example, the software application may provide a "channel listing" of live event experiences (broadly a plurality of captured videos being captured at a live event) that are available to the user of the endpoint device 116 who may be looking to access live event videos for viewing.

Figure 3:
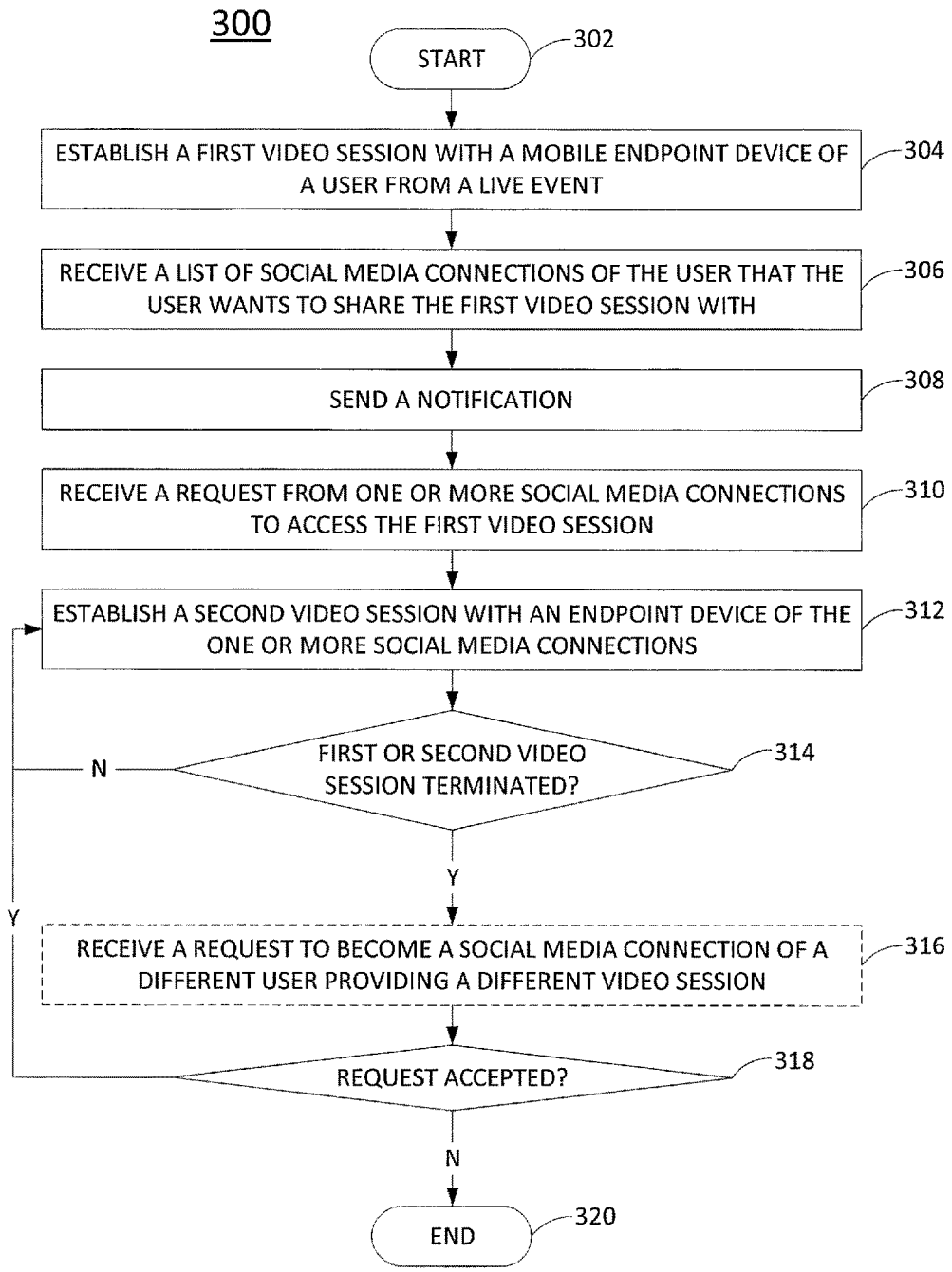
FIG. 3 illustrates a flowchart of an example method for sharing an experience via a social network on demand.

FIG. 3 illustrates a flowchart of an example method 300 sharing an experience via a social network on demand in accordance with the present disclosure. In one embodiment, steps, functions, and/or operations of the method 300 may be performed by an AS 104. In one embodiment, the steps, functions, or operations of method 300 may be performed by a computing device or system 400, and/or processor 402 as described in connection with FIG. 4 below. For illustrative purpose, the example method 300 is described in greater detail below in connection with an embodiment performed by a processor, such as processor 402.

The method 300 begins in step 302. At step 304, a processor establishes a first video session with a mobile endpoint device of a user from a live event. For example, the user may be at a commercial venue for a live sporting event or a musical concert and want to share his or her experience with one or more of his or her social media connections. In one embodiment, a software application (app) may be downloaded on the mobile endpoint device of the user to allow the user to capture the video and establish the first video session with a server operated by the service provider of the on-demand social media experience sharing service (broadly a subscribed service).

In one embodiment, the processor may establish a plurality of different video sessions from a plurality of different users. For example, the live event may have many users in different seats who are subscribers to the on-demand social media experience sharing service and are capturing videos with their respective mobile endpoint devices. As a result, the service provider may have video sessions from a variety of different perspectives and views within the same venue of the live event. The different views may be presented to other subscribers or the social media connections of the user of the first video session to allow the other subscribers to possibly select a different view by connecting as a social media connection with the plurality of different users.

In one embodiment, prior to the establishment of the first video session, an authentication of the user is performed, i.e., the establishment of the first video session is only performed after the mobile endpoint device is authenticated as being allowed to capture the video of the live event at the commercial venue. The authentication of the user can be performed in a number of different approaches. For example, a user may only be allowed to capture video at the live event after providing an access code back to the service provider before the first video session is established. For example, the access code can be provided based on certain level or type of tickets, e.g., premium tickets with video capturing rights. The access code can be obtained (e.g., electronically) when the user registers his or her mobile endpoint device at the commercial venue, e.g., via a kiosk located at the stadium. In one embodiment, the ability to capture video of the live event at the commercial venue may require the payment of an additional charge by the user.

Alternatively, in another embodiment, the authentication can be based on geo-fencing. Broadly, geo-fencing is a feature that uses physical location information, e.g., as provided by a global positioning system (GPS) or radio frequency identification (RFID), to define geographical boundaries. For example, the venue owner may want to limit video capture by the attendees who are located at certain physical locations of the commercial venue. For example, the venue owner may disallow attendees at court side of a basketball game to capture such "near" or "close" videos of the live event since such captured videos may compete with live broadcasts of the live event by the venue owner. However, the venue owner may allow video captures by the attendees who are located at the upper decks of a large stadium. Given the greater distance to the live event, such "far" or "remote" videos of the live event may not be deemed to be competitive with live broadcasts of the live event by the venue owner. Thus, the authentication is premised on whether the mobile endpoint device of the user is within a permissible physical area, e.g., a geo-fence defined area, that allows the capture of video of the live event at the commercial venue. If the user's mobile endpoint device is properly authenticated, then the method 300 will establish the first video session.

At step 306, the processor receives a list of social media connections of the user that the user wants to share the first video session with (broadly at least one social media connection for receiving the captured live event video received via the first video session). For example, user may use the app on his or her mobile endpoint device to manage his or her social media connections. The user may then select which social media connections he or she would like to share the live event experience with. The selections may then be forwarded to the service provider of the on-demand social media experience sharing service.

At step 308, the processor sends a notification. For example, the notification may be sent to each social media connection from the list of social media connections of the user that the first video session is available. In one example, the notification may be sent as a message notification from the app that the social media connections have also downloaded on their respective endpoint device. In another example, the notification may be sent via a text message, a telephone call, an email, and the like.

At step 310, the processor receives a request from one or more social media connections to access the first video session. For example, after the social media connections receive the notification, one or more of the social media connections from the user's list of social media connections may decide to share the live event experience with the user and view the live event video received in the first video session. As a result, one or more of the social media connections may send separate requests to the server to request access to the first video session.

At step 312, the processor establishes a second video session with an endpoint device of the one or more social media connections. In one embodiment, the access may be provided via a second video session that is independent from and different than the first video session. In other words, the present disclosure does not provide a point to point video session (e.g., a video conference, a Skype® call, a Facetime® call, and the like). Rather, the present disclosure establishes two separate video sessions to provide access to the captured video received (and stored) from the user via the first video session to one or more of the social media connections of the user.

Using two separate video sessions may allow the service provider to better regulate, disseminate, meter and/or secure the user captured video, e.g., ensuring that the recipient of the video is an authorized subscriber, ensuring proper accounting of the number of viewers accessing the captured videos to ensure that the event promoters will be accurately compensated for allowing such shared viewings, ensuring that there is sufficient bandwidth in the network to handle the number of requests for receiving the captured video, ensuring that the video is encoded with the necessary safeguards (e.g., use of public and private keys for encoding) and so on. These are only examples of additional processing that can be performed by the service provider.

In addition, using separate video sessions may allow the service provider to address compatibility issues, e.g., encoding the video properly for the endpoint device of each one of the social media connections who requests to access the video of the first video session. For example, since the social media connections are also subscribers to the service, the service provider may know what types of endpoints are associated with each social media connection of the user. Thus, the service provider may encode the video using a first video encoding compatible with the endpoint device of a first social media connection and encode the same video using a second different video encoding that is compatible with the endpoint device of a second social media connection. As a result, the experience sharing may be maximized for each social media connection for the respective endpoint device being used to view the video captured by the user at the live event.

In one embodiment, the user and the social media connections who have established the second video session may also establish a full duplex communication via the service provider. For example, the user and a social media connection may communicate with one another as they are sharing the experience. In one embodiment, the full duplex communication (e.g., broadly shown as communication 208 of FIG. 2) may be a messaging session (e.g., text messaging), a voice call, a video call, and the like.

In one embodiment, the full duplex media connection may be a point-to-point connection that is independent from, or a different session from, the two video sessions established with the server of the service provider. In other words, even if the video session are terminated the full duplex media connection may continue. For example, the user may end the first video session such that the social media connection no longer receives video over the second video session, but the user and the social media connection may still communicate with one another (e.g., the user may tell the social media connection "bye" or that the user is leaving the live event, etc.).

At step 314, the processor determines whether the first or second video session is terminated. For example, the user may leave the live event or stop capturing video of the live event with his or her mobile endpoint device. Alternatively, the one or more social media connections may decide to stop viewing the video of the live event and end the second video session. If the first or second video session is not terminated, the method 300 may return to step 312 and the first and second video session remains established.

However, if the first or second video session is terminated, the method 300 may proceed to optional step 316. At optional step 316, the processor may receive a request to become a social media connection of a different user providing a different video. For example, while viewing the video from the first video session, the social media connection may be provided a listing of other video sessions from different users in different seats at the live event.

For example, some video sessions may be provided by celebrities who have front row seats to the live event. The social media connection of the user may not be a social media connection of the different users providing the other video sessions. To view another video session, the social media connection of the user may send a request to one or more of the different users to become a social media connection of the one or more of the different users. It should be noted that step 316 can be triggered or entered without the need that the first or second video session be ended first. In other words, in one embodiment, a social media connection may opt to select a different captured live event video if such different captured live event video is made available for selection.

At optional step 318, the processor determines whether the request was accepted. If the request was accepted, the method 300 may return to step 312 to establish another or a different second video session with the endpoint device of the one or more social media connections. For example, in this instance, the second video session would include a different video from a different user that the social media connection of the user had requested to become a social media connection with.

However, at optional step 318 if the request is denied, then the method 300 may proceed to step 320. At step 320, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

As such, the present disclosure provides at least one advancement in the technical field of social media. This advancement allows for virtual reality seating of live events via sharing of experiences using on demand social networks. As a result, events may have in theory an unlimited number of tickets for sale by allowing users to share the live event experiences using on demand social networks in exchange for a subscription fee or a license with the service provider of the on demand social networks.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for sharing an experience via a social network on demand, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for sharing an experience via a social network on demand (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for sharing an experience via a social network on demand (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving, by a processor of a service provider of a communication network that provides a communication service, a request from a mobile endpoint device of a user to share a video of a live event at a commercial venue that the user is capturing;
    establishing, by the processor, a first video session with the mobile endpoint device of the user, the first video session containing the video of the live event at the commercial venue that the user is capturing, wherein the establishing is performed in response to determining that the mobile endpoint device has rights for sharing the video of the live event at the commercial venue;
    receiving, by the processor, at least one social media connection of the user for receiving the video;
    sending, by the processor, a notification to each social media connection of the at least one social media connection that the video is available;
    receiving, by the processor, a request from at least one of the at least one social media connection to access the video; and
    establishing, by the processor, a second video session with an endpoint device of the at least one of the at least one social media connection to provide the video.

2. The method of claim 1, further comprising:
    providing, by the processor, a plurality of different video sessions from a plurality of different users to the at least one of the at least one social media connection;
    receiving, by the processor, a request to become a social media connection of one of the plurality of different users associated with one of the plurality of different video sessions that is selected by the at least one of the at least one social media connection for viewing;
    receiving, by the processor, a confirmation to accept the request to become the social media connection from the one of the plurality of different users; and
    providing, by the processor, an access to the one of the plurality of different video sessions to the at least one of the at least one social media connection.

3. The method of claim 2, wherein each one of the plurality of different video sessions is captured from a different seat at the live event.

4. The method of claim 1, further comprising:
    determining, by the processor, a type of the endpoint device being used by the at least one of the at least one social media connection to establish the second video session; and
    encoding, by the processor, the video to be compatible with the type of the endpoint device being used by the at least one of the at least one social media connection.

5. The method of claim 1, wherein the video of the first video session is captured by the mobile endpoint device of the user.

6. The method of claim 1, wherein the live event comprises a live sporting event or a live musical concert.

7. The method of claim 1, wherein the user and the at least one of the at least one social media connection are paid subscribers of the service provider, for providing a service for providing on-demand social network experience sharing.

8. The method of claim 1, further comprising:
    establishing, by the processor, a full duplex communication between the user and the at least one of the at least one social media connection while the at least one of the at least one social media connection is viewing the video via the second video session.

9. The method of claim 8, wherein the full duplex communication comprises at least one of: a voice call, a video call or a messaging session.

10. A non-transitory computer-readable medium storing instructions which, when executed by a processor of a service provider of a communication network that provides a communication service, cause the processor to perform operations, the operations comprising:
    receiving a request from a mobile endpoint device of a user to share a video of a live event at a commercial venue that the user is capturing;
    establishing a first video session with the mobile endpoint device of the user, the first video session containing the video of the live event at the commercial venue that the user is capturing, wherein the establishing is performed in response to determining that the mobile endpoint device has rights for sharing the video of the live event at the commercial venue;
    receiving at least one social media connection of the user for receiving the video;
    sending a notification to each social media connection of the at least one social media connection that the video is available;
    receiving a request from at least one of the at least one social media connection to access the video; and
    establishing a second video session with an endpoint device of the at least one of the at least one social media connection to provide the video.

11. The non-transitory computer-readable medium of claim 10, the operations further comprising:
    providing a plurality of different video sessions from a plurality of different users to the at least one of the at least one social media connection;
    receiving a request to become a social media connection of one of the plurality of different users associated with one of the plurality of different video sessions that is selected by the at least one of the at least one social media connection for viewing;
    receiving a confirmation to accept the request to become the social media connection from the one of the plurality of different users; and
    providing an access to the one of the plurality of different video sessions to the at least one of the at least one social media connection.

12. The non-transitory computer-readable medium of claim 11, wherein each one of the plurality of different video sessions is captured from a different seat at the live event.

13. The non-transitory computer-readable medium of claim 10, the operations further comprising:

determining a type of the endpoint device being used by the at least one of the at least one social media connection to establish the second video session; and encoding the video to be compatible with the type of the endpoint device being used by the at least one of the at least one social media connection.

14. The non-transitory computer-readable medium of claim 10, wherein the video of the first video session is captured by the mobile endpoint device of the user.

15. The non-transitory computer-readable medium of claim 10, wherein the live event comprises a live sporting event or a live musical concert.

16. The non-transitory computer-readable medium of claim 10, wherein the user and the at least one of the at least one social media connection are paid subscribers of the service provider, for providing a service for providing on-demand social network experience sharing.

17. The non-transitory computer-readable medium of claim 10, the operations further comprising:

establishing a full duplex communication between the user and the at least one of the at least one social media connection while the at least one of the at least one social media connection is viewing the video via the second video session.

18. The non-transitory computer-readable medium of claim 17, wherein the full duplex communication comprises at least one of: a voice call, a video call or a messaging session.

19. An apparatus, comprising:

a processor of a service provider of a communication network that provides a communication service; and a computer-readable storage device storing a plurality of instructions which, when executed by the processor, cause the processor to perform operations, the operations comprising:

receiving a request from a mobile endpoint device of a user to share a video of a live event at a commercial venue that the user is capturing;

establishing a first video session with the mobile endpoint device of the user, the first video session containing the video of the live event at the commercial venue that the user is capturing, wherein the establishing is performed in response to determining that the mobile endpoint device has rights for sharing the video of the live event at the commercial venue;

receiving at least one social media connection of the user for receiving the video;

sending a notification to each social media connection of the at least one social media connection that the video is available;

receiving a request from at least one of the at least one social media connection to access the video; and establishing a second video session with an endpoint device of the at least one of the at least one social media connection to provide the video.

20. The apparatus of claim 19, the operations further comprising:

providing a plurality of different video sessions from a plurality of different users to the at least one of the at least one social media connection;

receiving a request to become a social media connection of one of the plurality of different users associated with one of the plurality of different video sessions that is selected by the at least one of the at least one social media connection for viewing;

receiving a confirmation to accept the request to become the social media connection from the one of the plurality of different users; and providing an access to the one of the plurality of different video sessions to the at least one of the at least one social media connection.

* * * * *